(12) United States Patent
Kuruma

(10) Patent No.: US 7,417,679 B2
(45) Date of Patent: Aug. 26, 2008

(54) IMAGE PICKUP APPARATUS AND IMAGE PICKUP METHOD

(75) Inventor: Daisuke Kuruma, Tokyo (JP)

(73) Assignee: Sony Corporation (JP)

( * ) Notice: Subject to any disclaimer, the term of this patent is extended or adjusted under 35 U.S.C. 154(b) by 670 days.

(21) Appl. No.: 10/944,911

(22) Filed: Sep. 21, 2004

(65) Prior Publication Data

US 2005/0094015 A1    May 5, 2005

(30) Foreign Application Priority Data

Oct. 1, 2003    (JP)    ............................ P2003-343027

(51) Int. Cl.
 *H04N 5/222*    (2006.01)
(52) U.S. Cl. ................................................ 348/333.02
(58) Field of Classification Search ............. 348/333.02
 See application file for complete search history.

(56) References Cited

U.S. PATENT DOCUMENTS

| | | | |
|---|---|---|---|
| 6,118,480 A * | 9/2000 | Anderson et al. | 348/207.99 |
| 7,053,951 B2 * | 5/2006 | Miller et al. | 348/333.05 |
| 7,061,535 B2 * | 6/2006 | Misawa et al. | 348/375 |
| 7,106,375 B2 * | 9/2006 | Venturino et al. | 348/333.02 |
| 2002/0057352 A1 * | 5/2002 | Yamagishi | 348/232 |
| 2002/0101515 A1 * | 8/2002 | Yoshida et al. | 348/211 |
| 2003/0026607 A1 * | 2/2003 | Okisu et al. | 396/213 |
| 2004/0109614 A1 * | 6/2004 | Enomoto et al. | 382/275 |
| 2007/0132860 A1 * | 6/2007 | Prabhu et al. | 348/231.3 |

FOREIGN PATENT DOCUMENTS

JP    2002-010133    1/2002

* cited by examiner

*Primary Examiner*—James M Hannett
(74) *Attorney, Agent, or Firm*—Rader Fishman & Grauer PLLC; Ronald P. Kananen

(57) ABSTRACT

The present invention is intended to let users easily and properly select desired imaging modes. A control section controls an image processing section to display icons indicative of imaging modes onto a monitor. When an icon is specified, the control section reads setting values corresponding to the imaging mode corresponding to the specified icon from a setting value storage section. The control section controls the image processing section to generate a reference image based on the read setting values and displays the generated reference image on the monitor. Namely, specifying an icon allows the user to look up a reference image which would have been obtained if a scene appearing on a stored image already taken were imaged in a specified imaging mode. This novel configuration allows the user to easily and properly confirm the effects of a selected imaging mode.

22 Claims, 6 Drawing Sheets

F I G. 1
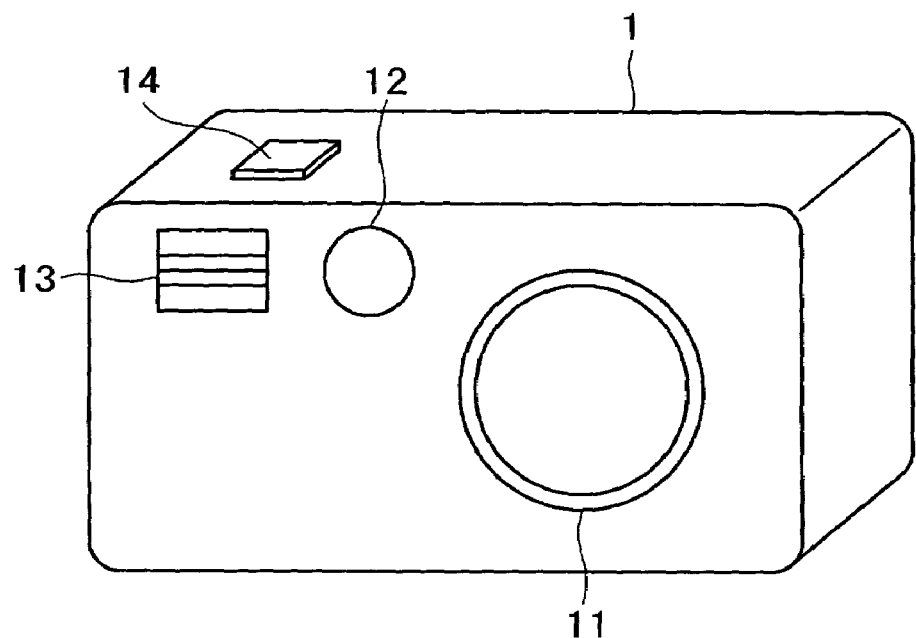
F I G. 2
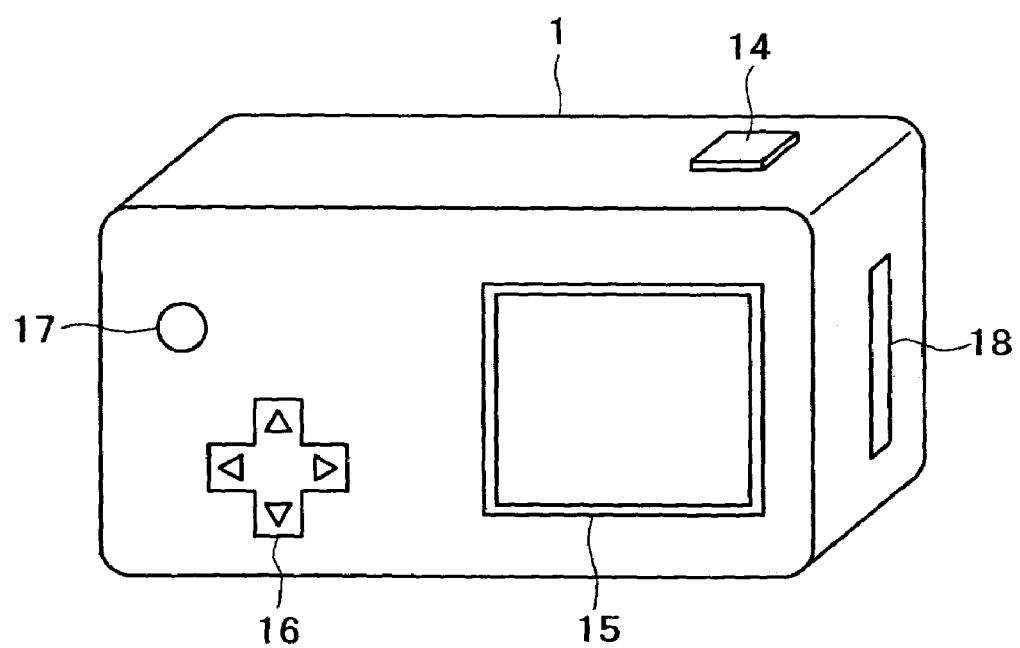

F I G. 5
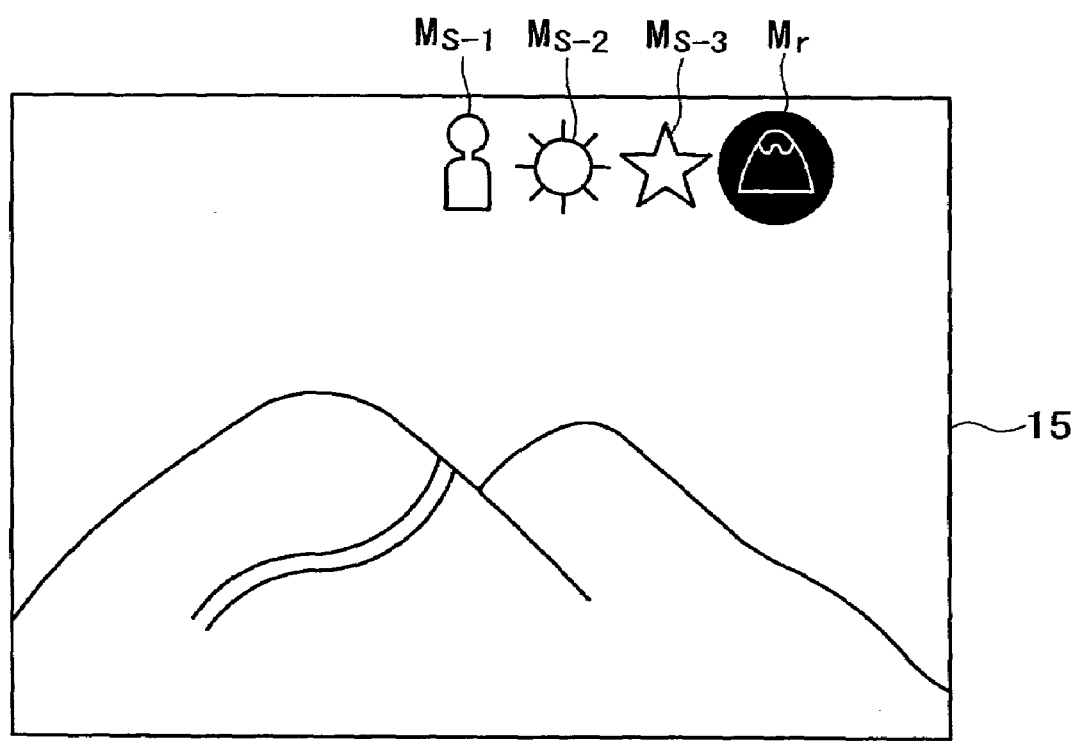

F I G. 7
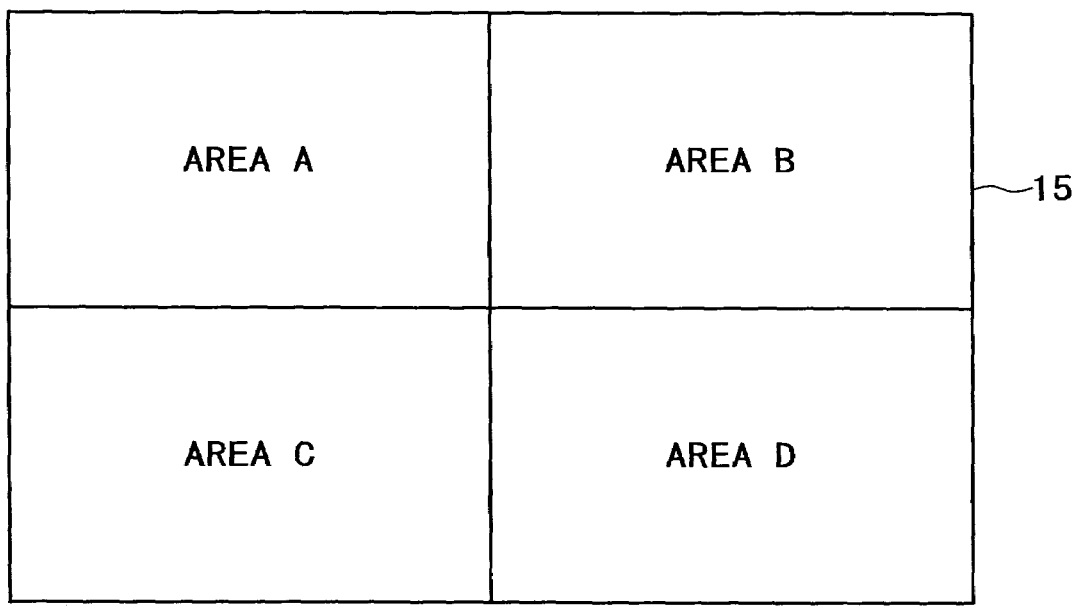

IMAGE PICKUP APPARATUS AND IMAGE PICKUP METHOD

BACKGROUND OF THE INVENTION

The present invention relates to an image pickup apparatus and an image pickup method and, more particularly, to an image pickup apparatus and an image pickup method which are adapted to easily and properly select imaging modes.

For example, digital still cameras have imaging mode capabilities that automatically set imaging conditions (shutter speeds and aperture values, for example) suitable for objects of imaging (scenes and peoples, for example) and imaging environments (outdoor and indoor, for example) by selecting prepared imaging modes.

When starting an imaging operation, a user selects an icon representing an imaging mode suitable for a subject of imaging and imaging environment from among several imaging modes (night scene mode, portrait mode, and scene mode, for example) displayed on the monitor section of the digital still camera, the predetermined imaging conditions assigned to the selected imaging mode are set (refer to patent document 1 shown below, for example). Namely, by use of this capability, the user can set optimum imaging conditions only through the selection of an imaging mode without having to individually set imaging conditions suitable for object of imaging and imaging environment.

[Patent Document 1] Japanese Patent Laid-open No. 2002-10133

In performing an imaging operation with imaging conditions set as described above, the user must learn by heart what each icon signifies (or which icon represents which mode) and the effects of the imaging modes. If the user cannot learn these by heart, the user must reference camera's instruction manuals for example in each case. Therefore, with related-art digital still cameras, there is a problem of taking a lot of trouble in selecting suitable imaging modes.

SUMMARY OF THE INVENTION

It is therefore a subject of the present invention to solve this problem by generating, from images already taken and recorded, an image which would have been obtained if it were imaged with a specified imaging mode and displaying the generated image, thereby allowing easy understanding of the meanings of icons and the effects of imaging modes.

In carrying out the invention and according to one aspect thereof, there is provided an image pickup apparatus including: a display section; an imaging condition storage section for storing an imaging condition for each of a plurality of imaging modes; a setting value storage section for storing a setting value for each of the plurality of imaging modes; a detection section for detecting a predetermined imaging mode from among the plurality of imaging modes; a display control section for performing image processing on one of images being taken and already taken on the basis of a setting value corresponding to the predetermined imaging mode detected by the detection section from among setting values stored in the setting value storage section and displaying a reference image obtained as a result of the image processing onto the display section; an operating section for accepting an operation input; and a setting section for setting, among imaging conditions stored in the imaging condition storage section, those image conditions of an imaging mode corresponding to the reference image selected by an operation input from the operating section.

The display control section can display a working image in a predetermined area of the display section and the reference image in another area of the display section.

The image pickup apparatus further includes a storage section for storing the identification information of the imaging mode set by the setting section, by which the detection section can at least detect any imaging mode of which identification information is stored in this storage section.

The detection section can detect the imaging mode corresponding to a subject of imaging and environment of an imaging operation to be executed.

In carrying out the invention and according to another aspect thereof, there is provided an image pickup method including the steps of: storing an imaging condition for each of a plurality of imaging modes; storing a setting value for each of the plurality of imaging modes; detecting a predetermined imaging mode from among the plurality of imaging modes; performing image processing on one of images being taken and already taken on the basis of a setting value corresponding to the predetermined imaging mode detected in the detection step from among setting values stored the setting value storage step and displaying a reference image obtained as a result of the image processing; accepting an operation input; and setting, among imaging conditions stored by the imaging condition storage step, those image conditions of an imaging mode corresponding to the reference image selected by an operation input performed in the operating step.

In the image pickup apparatus and image pickup method according to the invention, a predetermined image mode is selected from among a plurality of imaging modes, image processing is performed on an image being taken or already taken on the basis of the setting values corresponding to the imaging conditions of the detected imaging mode, reference images obtained as a result of this image processing are displayed on the display section, a desired reference image is selected, and the imaging conditions of the imaging mode corresponding to the selected reference image are set.

BRIEF DESCRIPTION OF THE DRAWINGS

FIG. 1 is an external view of a digital still camera practiced as one embodiment of the invention;

FIG. 2 is another external view of the above-mentioned digital still camera;

FIG. 5 is a diagram illustrating an exemplary display of imaging mode icons;

FIG. 7 is a diagram illustrating display areas on a monitor shown in FIG. 2.

DESCRIPTION OF THE PREFERRED EMBODIMENT

Figure 3:
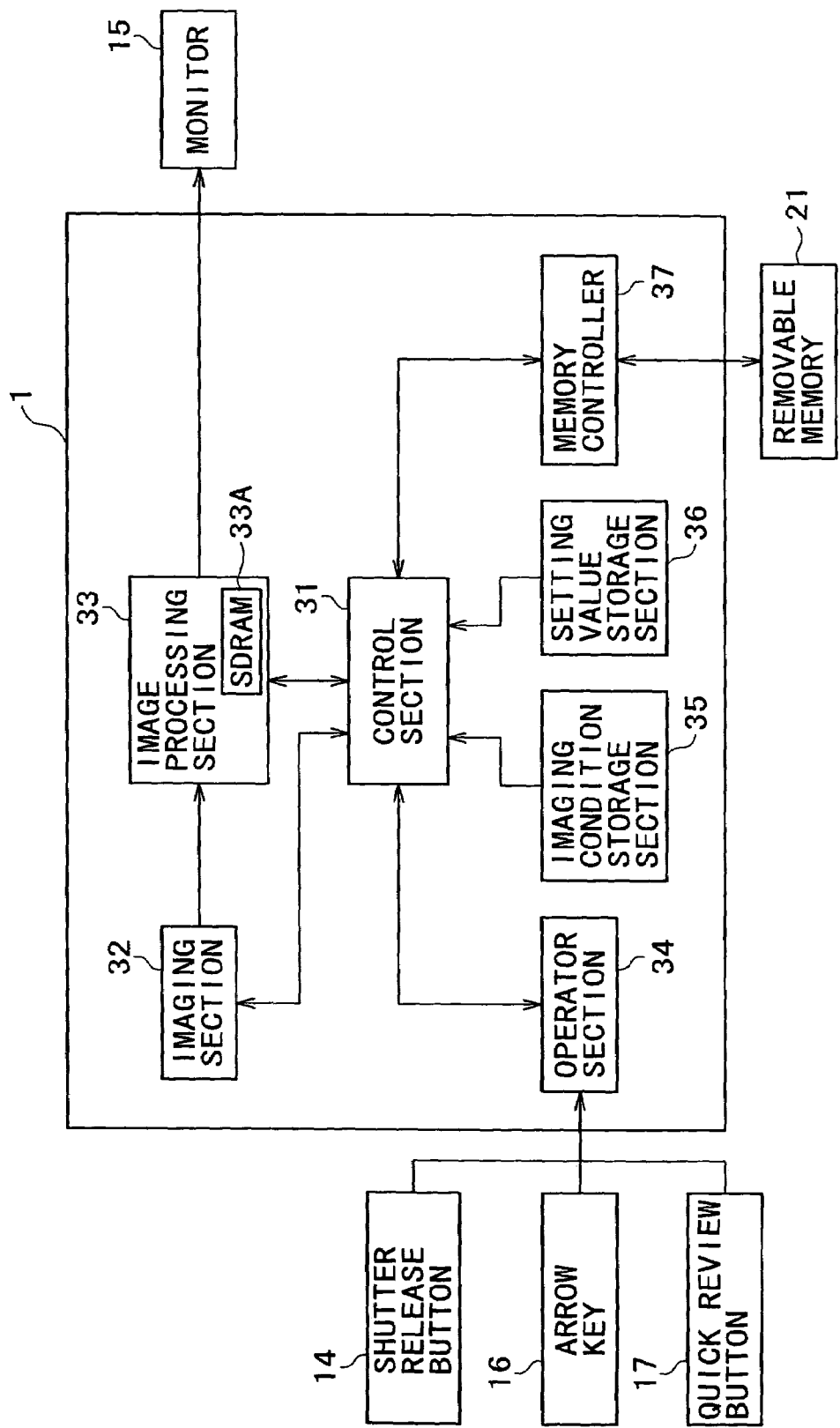
FIG. 3 is a section diagram illustrating an exemplary internal configuration of the above-mentioned digital still camera.

In order to clarify the correlation between the means of the invention described in the claims appended hereto and the components of the embodiment of the invention, each of the means is followed by parentheses in which an example of the corresponding component of the embodiment is enclosed. It should be noted however that each of these means is not restricted to those described below.

According to the present invention, an image pickup apparatus is provided. This image pickup apparatus (a digital still camera 1 shown in FIG. 3, for example) includes a detection section (a control section 31 shown in FIG. 3) for detecting a predetermined imaging mode from among a plurality of imaging modes, a display control section (an image processing section 33 shown in FIG. 3) for performing image processing on an image being taken or already taken on the basis of the settings corresponding to the imaging conditions of the predetermined imaging mode detected by the detection section and displaying an obtained reference image onto a display section (a monitor 15 shown in FIG. 3), an operator section (an operator section 34 shown in FIG. 3) for accepting input operations for selecting the reference image shown on the display section, and a setting section (an imaging section shown in FIG. 3) for setting the imaging conditions of the imaging mode corresponding to the reference image selected by the input operation from the operator section.

Figure 6:
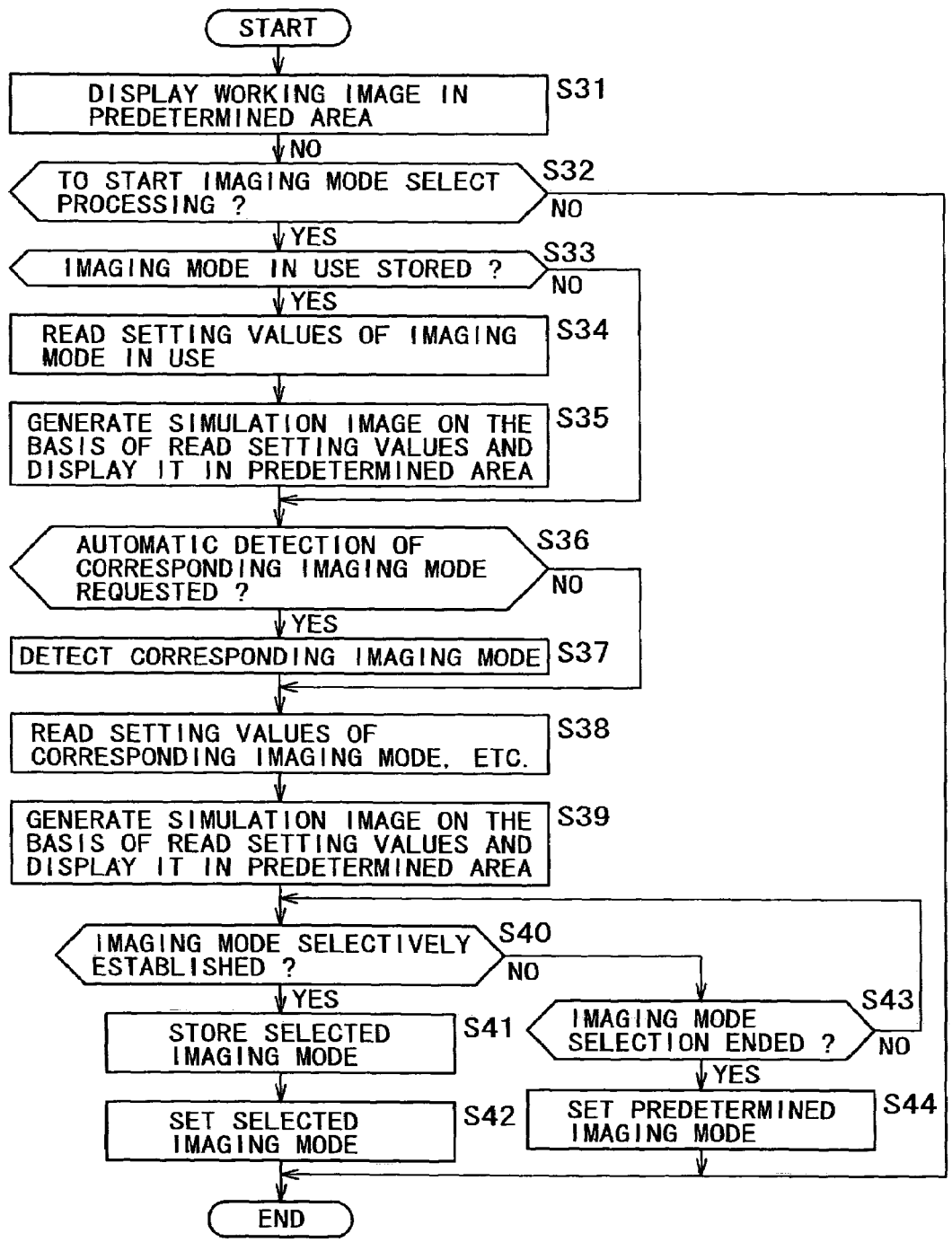
FIG. 6 is a flowchart indicative of another imaging condition setting process.

The display control section (the image processing section 33 shown in FIG. 3 for executing the processes of steps S35 and S40 shown in FIG. 6, for example) can display a working image in a predetermined area of the display section and a reference image in another predetermined area of the display section.

The image pickup apparatus according to the invention further includes a storage section (an SDRAM 33A shown in FIG. 3, for example) for storing the identification information of the image mode set through the setting section to allow the detection section (the control section 31 shown in FIG. 3 for executing the process of step S4 shown in FIG. 4) to at least detect the imaging mode of which identification information is stored in the storage section.

Figure 4:
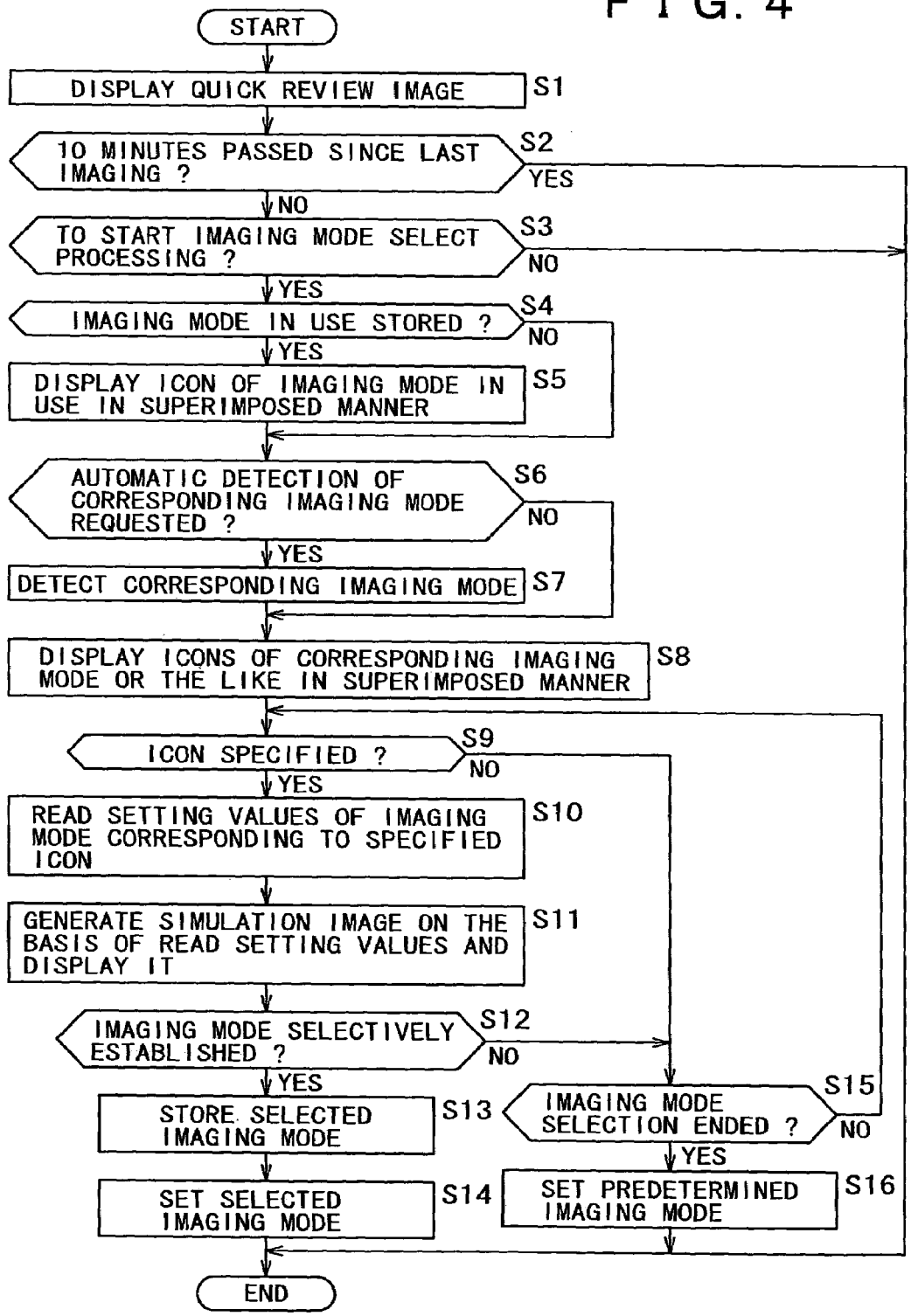
FIG. 4 is a flowchart indicative of an imaging condition setting process.

The detection section (the control section 31 for executing the processes of steps S6 and S7 shown in FIG. 4, for example) can detect the imaging mode corresponding to a subject of imaging to be imaged or imaging environment.

According to the present invention, an image pickup method is provided. This image pickup method includes the steps of detecting a predetermined imaging mode from among a plurality of imaging modes (steps S4 through S8 shown in FIG. 4, for example), performing image processing on an image being taken or already taken on the basis of the settings corresponding to the imaging conditions of the predetermined imaging mode detected by the detection section and displaying an obtained reference image onto a display section (steps S10 and S11 shown in FIG. 4, for example), accepting input operations for selecting the reference image shown on the display section (step S12 shown in FIG. 4, for example), and setting the imaging conditions of the imaging mode corresponding to the reference image selected by the input operation from the operator section (step S14 shown in FIG. 4, for example).

Now, referring to FIGS. 1 and 2, there are shown perspective views illustrating the front and rear of the digital still camera 1 according to the invention.

The digital still camera 1 is arranged with a fixed lens 11, an optical finder 12, and a strobe light 13 on the front side and with a shutter release button 14 on the top side. On the rear side of the digital still camera 1, a TFT liquid crystal monitor 15, an arrow key 16, and a quick review button 17 are arranged. On one side of the digital still camera 1, a slot 18 in which a recording medium (a removable memory 21 (FIG. 3)) is loaded is arranged. It should be noted that the digital still camera 1 is also arranged with operation keys other than the arrow key 16 and the quick review button 17, these other operation keys being not shown.

Referring to FIG. 3, there is shown an exemplary internal configuration of the digital still camera 1.

An imaging section 32 is composed of the fixed lens 11, a focus lens, not shown, a drive mechanism for holding this focus lens, an AF driver for driving this drive mechanism, an aperture section, a driver for driving the aperture section to adjust the quantity of light of a subject image incident on a CCD (Charge Coupled Device), and this CCD or the like.

The imaging section 32 supplies the image data obtained as a result of imaging to the image processing section 33.

The image processing section 33 displays the image supplied from the imaging section 32 onto the TFT liquid crystal monitor 15 as a working image under the control of the control section 31. Also, the image processing section 33 performs compression processing based on the JPEG (Joint Photographic Experts Group) standard for example on the image supplied from the imaging section 32 by use of the SDRAM (Synchronous DRAM) 33A as the work memory and supplies the compressed image to the control section 31.

The operator section 34 supplies the signals indicative of the operations performed on the shutter release button 14, the arrow key 16, and the quick review button 17 to the control section 31.

An imaging condition storage section 35 stores the imaging conditions assigned to each of the imaging modes. For example, in correspondence to the night scene mode, the imaging condition storage section 35 stores the imaging conditions such as optimum shutter speed and aperture value for imaging a night scene.

A setting value storage section 36 stores, for each imaging mode, the image processing setting values necessary for generating an image which would have been obtained if a subject image were imaged under the imaging conditions of a specified mode, which will be described later.

A memory controller 37 stores the image data supplied via the control section 31 and compressed by the image processing section 33 into the removable memory 21 and reads predetermined images (taken images) from the removable memory 21 to supply them to the control section 31.

The control section 31 controls each component of the digital still camera 1 in accordance with input signals supplied from the operator section 34. For example, the control section 31 controls the image processing section 33 to display a working image onto the TFT liquid crystal monitor 15 and execute JPEG compression processing.

When an imaging mode is selected by the processing to be described later, the control section 31 sets the imaging conditions of the selected imaging mode to each component of the imaging section 32. By this, it becomes possible to perform an imaging operation under these imaging conditions.

The following describes the imaging condition setting processing with reference to the flowchart shown in FIG. 4.

When the user operates the quick review button 17, the control section 31 controls the image processing section 33 in step S1 to display an image taken last (a latest taken image) stored in the SDRAM 33A onto the TFT liquid crystal monitor 15.

In step S2, the control section 31 determines whether 10 minutes for example have passed since the last imaging operation (or from the time at which the image read in step S1 was taken) or not. If the determination is no, then the procedure goes to step S3.

In step S3, the control section 31 determines on the basis of the input signal supplied from the operator section 34 whether or not the imaging mode selection processing has been indicated. If this processing is found directed, then the procedure goes to step S4 to execute the subsequent processing.

In step S4, the control section 31 determines whether or not the identification information of the selected imaging mode is stored in the SDRAM 33A as described later. If this identification information is found stored, then the procedure goes to step S5.

Because the identification information of the selected imaging mode is stored in the SDRAM 33A as will be described later (step S13), the procedure goes to step S5 if the identification information of a predetermined imaging mode is stored in the SDRAM 33A by the processing executed before. It should be noted that the imaging mode of which identification information is stored in the SDRAM 33A will be appropriately referred to as an imaging mode in use.

In step S5, the control section 31 controls the image processing section 33 to display an icon indicative of the imaging mode in use onto the TFT liquid crystal monitor 15 in an superimposed manner.

If the identification information of the imaging mode in use is found not stored in step S4 or, when the icon indicative of the imaging mode in use is displayed in a superimposed manner in step S5, then the procedure goes to step S6.

In step S6, the control section 31 determines whether or not to automatically detect an imaging mode corresponding to a subject of imaging and imaging environment of an imaging operation to be executed (hereafter referred to as a corresponding imaging mode) from among the imaging modes prepared in the digital still camera 1 (hereafter referred to as a standard imaging mode). If the automatic detection of the corresponding imaging mode is found directed on the basis of an input signal supplied from the operator section 34, then the procedure goes to step S7 to detect the corresponding imaging mode by use of the imaging section 32 and sensors, not shown.

If the input signal indicative of the direction of the automatic detection of the corresponding imaging mode is found not supplied from the operator section 34 within a predetermined period in step S6, then the control section 31 determines that the automatic detection of the corresponding imaging mode is not executed, upon which the procedure goes to step S8. Or if the corresponding imaging mode has been detected in step S7, then the procedure goes to step S8. In step S8, the control section 31 controls the image processing section 33 to display the icon indicative of the detected corresponding imaging mode onto the TFT liquid crystal monitor 15 in an superimposed manner. If the process of step S7 has been skipped, the control section 31 displays the icon indicative of the standard imaging mode onto the TFT liquid crystal monitor 15 in a superimposed manner.

Referring to FIG. 5, there is shown an exemplary display of the icons indicative of imaging mode in use and standard imaging modes. In this example, icon Mr indicative of imaging mode in use is shown white on black, unlike icons Ms-1, Ms-2, and Ms-3 indicative of standard imaging modes.

When the corresponding imaging mode has been detected in step S7, only the icon indicative of the corresponding imaging mode of the standard imaging modes is displayed on the TFT liquid crystal monitor 15 along with the imaging mode in use. Alternatively, all the standard imaging mode icons may be displayed and the corresponding image mode icon among them may be displayed on the TFT liquid crystal monitor 15 in a different manner (for example, in a different color or by blinking) than the other standard imaging mode icons.

Referring to FIG. 4 in step S9 again, the control section 31 determines whether or not one icon has been specified through a key operation from among the icons displayed in step S8. If one icon is found specified, then the procedure goes to step S10.

In step S10, the control section 31 reads the setting values for image processing corresponding to the imaging mode indicated by the specified icon from the setting value storage section 36.

Next, in step S1, the control section 31 controls the image processing section 33 to generate a simulation image based on the setting values in image processing read in step S10 and displays the generated simulation image onto the TFT liquid crystal monitor 15. To be more specific, the image processing section 33 performs the image processing on the quick review image (the image taken last) on the basis of the setting values in image processing supplied from the control section 31 and read in step S10 to generate a simulation image and displays it onto the TFT liquid crystal monitor 15.

Namely, the simulation image becomes an image representing in simulation an image which would have been obtained by imaging, in the imaging mode specified in step S9, a scene shown on a quick review image.

In step S12, the control section 31 determines whether or not the simulation image displayed in step S11 has been specified and the selection of an image mode has been established. Namely, the control section 31 determines whether or not an input signal indicative of a user key operation has been supplied from the operator section 34 with a simulation image displayed for example and the selection of the imaging mode specified in step S9 has been established.

If the selection of the imaging mode is found established in step S12, then the procedure goes to step S13, the control section 31 stores (or rewrite) the identification information of the selected imaging mode into the SDRAM 33A.

Next, in step S14, the control section 31 reads the imaging conditions stored in the associated information search section 35 in correspondence with the selected imaging mode and sets these imaging conditions to the imaging section 32. Consequently, the imaging operation can be executed under the imaging conditions corresponding to the imaging mode selected in step S12.

If no icon is found specified in step S9 or if the selection of the imaging mode is found not established in step S12, then the procedure goes to step S15.

In step S15, the control section 31 determines whether or not the image mode selection has ended. If the image mode selection is found not ended, then the procedure returns to step S9 to wait until a next icon is specified.

If the imaging mode selection is found ended in step S15, then the procedure goes to step S16, the control section 31 sets a predetermined imaging mode (for example, a standard imaging mode) and sets the imaging conditions corresponding to this predetermined imaging mode to the imaging section 32. In this case, an imaging operation can be performed under the predetermined image conditions.

If 10 minutes have passed since the last imaging operation in step S2 or if the imaging mode selection processing is not executed in step S3, then the processing comes to an end.

As described above, when an imaging mode is specified (in the above-mentioned example, when an icon indicative of an imaging mode is specified), a simulation image to be obtained when an imaging operation is executed under the imaging conditions corresponding to the specified imaging mode is displayed. This allows the user to easily and properly recognize the effects of each specified imaging mode.

In the above-mentioned configuration, an imaging mode corresponding to one of these display icons is selected. Also, the user may select any imaging mode other than those corresponding to icons.

Generating an image which would have been obtained by performing image processing on an image with the predetermined setting values in image processing and taking this image under predetermined imaging conditions can also be executed by use of a so-called personal computer. However, in the present invention, the digital still camera 1 itself generates a simulation image and displays the generated simulation image, so that the user can display the simulation image immediately before executing an imaging operation, thereby confirming the effects of each specified imaging mode. In addition, because the setting values in image processing which are used in the above-mentioned configuration are computed on the basis of the performance of each individual digital still camera 1, simulation images that are nearer to reality can be generated than using the general setting values of an application program of personal computers.

In the above-mentioned configuration, imaging mode icons are displayed and, when one of them is selected, the simulation image of the imaging mode corresponding to the selected icon is displayed. Alternatively, a plurality of simulation images may be displayed in a divided manner along with a working image. The following describes this alternative with reference to the flowchart shown in FIG. 6.

When the quick review button 17 (in this example, an image mode selector is assigned) in step S31, the control section 31 controls the image processing section 33 to display a working image in a predetermined area (area A in the example shown in FIG. 7) of the TFT liquid crystal monitor 15.

Next, in step S32, the control section 31 determines whether or not imaging mode selection processing has been directed on the basis of the input signal supplied from the operator section 34. If imaging mode selection processing is found directed, then the procedure goes to step S33. In step S33, the control section 31 determines whether or not the identification information of the imaging mode in use is stored in the SDRAM 33A. If the identification information is found stored, then the procedure goes to step S34.

In step S34, the control section 31 reads the setting values in image processing corresponding to the image mode in use from the setting value storage section 36. In step S35, the control section 31 controls the image processing section 33 to generate a simulation image for the working image on the basis of the setting values in image processing read in step S34 and display the generated simulation image in a predetermined area (in the example shown in FIG. 7, area B) of the TFT liquid crystal monitor 15.

In step S36, the control section 31 determines whether to execute the automatic detection of the imaging mode (the corresponding imaging mode) of a subject and imaging environment of an imaging operation to be executed. If the automatic detection of the corresponding imaging mode is found directed on the basis of the input signal supplied from the operator section 34, then the procedure goes to step S37, the control section 31 detects the corresponding imaging mode by use of the control section 31 and sensors.

In step S36, if the control section 31 determines that the automatic detection of the corresponding imaging mode is not to be executed because the input signal indicative of the corresponding imaging mode automatic detection has not been supplied from the operator section 34 within a predetermined period or, if the corresponding imaging mode is detected in step S37, then the procedure goes to step S38. If the corresponding imaging mode is detected in step S37, then the control section 31 reads the setting values in image processing corresponding to the detected corresponding image mode from the setting value storage section 36. If the process of step S37 is skipped, the control section 31 reads the setting values in image processing corresponding to the standard imaging mode from the setting value storage section 36. In step S39, the control section 31 controls the image processing section 33 to generate simulation images for the working images on the basis of the setting values in image processing read in step S38 and display the generated simulation image in predetermined areas (in the example shown in FIG. 7, areas C and D) of the TFT liquid crystal monitor 15. It should be noted that, if the number of simulation images is greater than the number of image areas, the simulation images are displayed sequentially in accordance with the user operation of the arrow key 16, for example.

In step S40, the control section 31 determines whether or not the displayed simulation image has been specified and the image mode selection has been established. If the image mode selection is found established, then the procedure goes to step S41.

In steps S41 through S44, the substantially the same processing as that of steps S13 through S16 shown in FIG. 4 is executed, so that the description of the processing of steps S41 through S44 will be skipped.

As described, a working image and a simulation image based on this working image are displayed in a divided manner, so that the user can selects desired imaging mode while determining a picture composition. Since a plurality of simulation images are displayed, the user can easily understand the differences between effects of an imaging mode, thereby properly selecting desired imaging modes.

In addition, in the above-mentioned configuration, an imaging mode that corresponds to any one of the displayed simulation images is selected; alternatively, the present invention may be configured so that the user selects any other imaging modes than the above-mentioned imaging modes.

While a preferred embodiment of the present invention has been described using specific terms, such description is for illustrative purpose only, and it is to be understood that changes and variations may be made without departing from the spirit or scope of the following claims.

What is claimed is:

1. An image pickup apparatus comprising:
    a display section;
    an imaging condition storage section for storing an imaging condition for each of a plurality of imaging modes;
    a setting value storage section for storing setting values for each of said plurality of imaging modes;
    a detection section for detecting a selected imaging mode from among said plurality of imaging modes;
    a display control section for performing image processing on a working image that has been previously taken, said image processing being performed on the basis of setting values corresponding to said selected imaging mode detected by said detection section from among setting values stored in said setting value storage section, and for displaying a reference image obtained as a result of said image processing onto said display section, wherein the reference image constitutes a simulated image that would result had the working image been taken in the selected imaging mode;
    an operating section for accepting an operation input; and
    a setting section for setting, among imaging conditions stored in said imaging condition storage section, those imaging conditions of an imaging mode corresponding to said reference image selected by an operation input from said operating section.

2. The image pickup apparatus according to claim 1, wherein said display control section displays an icon corresponding to said selected imaging mode detected by said detection section onto said display section and performs image processing on the basis of said setting value corresponding to said icon selected by an operation input from said operating section.

3. The image pickup apparatus according to claim 1, wherein said display control section displays said working image in a predetermined area of said display section and said reference image in a different area of said display section.

4. The image pickup apparatus according to claim 1, further comprising:
a storage section for storing identification information of said imaging mode corresponding to said imaging condition set by said setting section;
wherein said detection section at least detects said imaging mode corresponding to said identification information stored in said storage section.

5. The image pickup apparatus according to claim 1, wherein said detection section at least detects an imaging mode corresponding to a subject of imaging and environment of an imaging operation to be executed.

6. The image pickup apparatus according to claim 1, wherein said display control section determines beforehand whether or not a predetermined period has passed since the taking of said working image and performs said image processing on said working image only when said predetermined period is found not having passed since the taking of said working image.

7. The image pickup apparatus according to claim 1, wherein a mode other than the mode corresponding to said reference image is selectable by an operation input through said operating section.

8. The image pickup apparatus according to claim 2, further comprising:
a storage section for storing identification information of said imaging mode corresponding to said imaging condition set by said setting section;
wherein said detection section detects said imaging mode corresponding to said identification information stored in said storage section.

9. The image pickup apparatus according to claim 2, wherein said detection section at least detects an image mode corresponding to a subject of imaging and environment of an imaging operation to be executed.

10. The image pickup apparatus according to claim 8, wherein said display control section displays an icon corresponding to said imaging mode corresponding to said identification information stored in said storage section in a different manner from that in which other icons are displayed.

11. The image pickup apparatus according to claim 9, wherein said display control section displays an icon corresponding to an imaging mode corresponding to a subject of imaging and environment of an imaging operation to be executed in a different manner from that in which other icons are displayed.

12. An image pickup method comprising the steps of:
storing an imaging condition for each of a plurality of imaging modes;
storing a setting value for each of said plurality of imaging modes;
detecting a selected imaging mode from among said plurality of imaging modes;
performing image processing on a working image that has been previously taken, said image processing being performed on the basis of setting values corresponding to said selected imaging mode detected in the detection step and displaying a reference image obtained as a result of said image processing, wherein the reference image constitutes a simulated image that would result had the working image been taken in the selected imaging mode;
accepting an operation input; and
setting those image conditions of an imaging mode corresponding to said reference image selected by an operation input in the operating step among imaging conditions stored by the imaging condition storage step.

13. The image pickup method according to claim 12, wherein said display control step displays an icon corresponding to said selected imaging mode detected in said detection step and performs image processing on the basis of said setting value corresponding to said icon selected by an operation input in said operating step.

14. The image pickup method according to claim 12, wherein said display control step displays said working image in a predetermined area of a display section and said reference image in a different area of said display section.

15. The image pickup method according to claim 12, further comprising the step of:
storing identification information of said imaging mode corresponding to said imaging condition set by said setting section;
said detection step at least detects said imaging mode corresponding to said identification information stored by said storage step.

16. The image pickup method according to claim 12, wherein said detection step at least detects an imaging mode corresponding to a subject of imaging and environment of an imaging operation to be executed.

17. The image pickup method according to claim 12, wherein said display control step determines beforehand whether or not a predetermined period has passed since the taking of said working image and performs said image processing on said image only when said predetermined period is found not having passed since the taking of said working image.

18. The image pickup method according to claim 12, wherein an imaging mode other than the imaging mode corresponding to said reference image is selectable by an operation input in said operating step.

19. The image pickup method according to claim 13, further comprising the step of:
storing identification information of said imaging mode corresponding to said imaging condition set by said setting step;
wherein said detection step detects said imaging mode corresponding to said identification information stored in said storage step.

20. The image pickup method according to claim 13, wherein said detection step at least detects an image mode corresponding to a subject of imaging and environment of an imaging operation to be executed.

21. The image pickup method according to claim 19, wherein said display control step displays an icon corresponding to said imaging mode corresponding to said identification information stored in said storage step in a different manner from that in which other icons are displayed.

22. The image pickup method according to claim 20, wherein said display control step displays an icon corresponding to an imaging mode corresponding to a subject of imaging and environment of an imaging operation to be executed in a different manner from that in which other icons are displayed.

* * * * *